United States Patent [19]

Cambrodon

[11] Patent Number: 4,585,968
[45] Date of Patent: Apr. 29, 1986

[54] DEVICE FOR HOLDING AND CENTERING OF A BRUSH HOLDER WASHER, DURING ASSEMBLY, ON AN ELECTRIC ROTATING COMMUTATOR MACHINE

[75] Inventor: Francisco Cambrodon, Francheville, France

[73] Assignee: Societe de Paris et du Rhone, Lyons, France

[21] Appl. No.: 625,628

[22] Filed: Jun. 28, 1984

[30] Foreign Application Priority Data

Jul. 1, 1983 [FR] France ............................ 83 11370

[51] Int. Cl.⁴ .......................................... H02K 13/00
[52] U.S. Cl. .................................... 310/239; 310/242
[58] Field of Search ................ 310/42, 238, 239, 242, 310/244, 245, 246, 247

[56] References Cited
U.S. PATENT DOCUMENTS 4,114,061  9/1978  Hayes .................................. 310/242

FOREIGN PATENT DOCUMENTS 2044552  10/1980  United Kingdom ................ 310/239

Primary Examiner—Peter S. Wong
Assistant Examiner—D. L. Rebsch
Attorney, Agent, or Firm—Browdy and Neimark

[57] ABSTRACT

An electric motor with commutator having more than two poles comprises two brushes and two brush holders placed 90° in relation to one another and mounted on an independent brush holder washer. To hold the washer centered during assembly, a pin 7 is provided, fastened to the washer approximately on the bisector of the angle formed by the two brushes, and in opposition to these brushes. Under the pressure of brushes 3, pin 7 rests along a generatrix of commutator 5 to stop washer 1 in a position almost centered in relation to the commutator, which then facilitates mounting of the flange constituting the cover and bearing of the electric motor.

10 Claims, 4 Drawing Figures

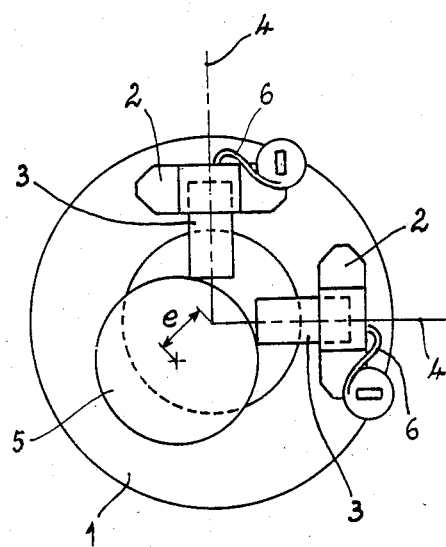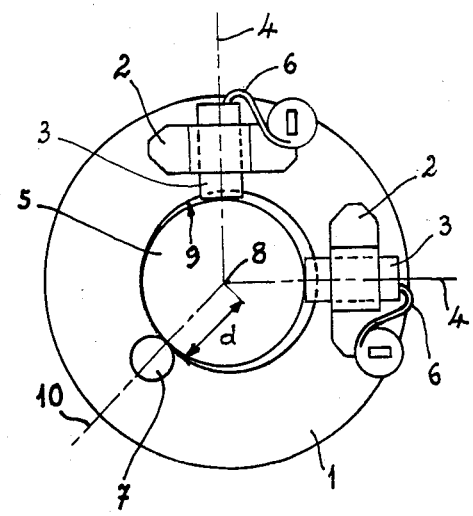
FIG.1  FIG.2
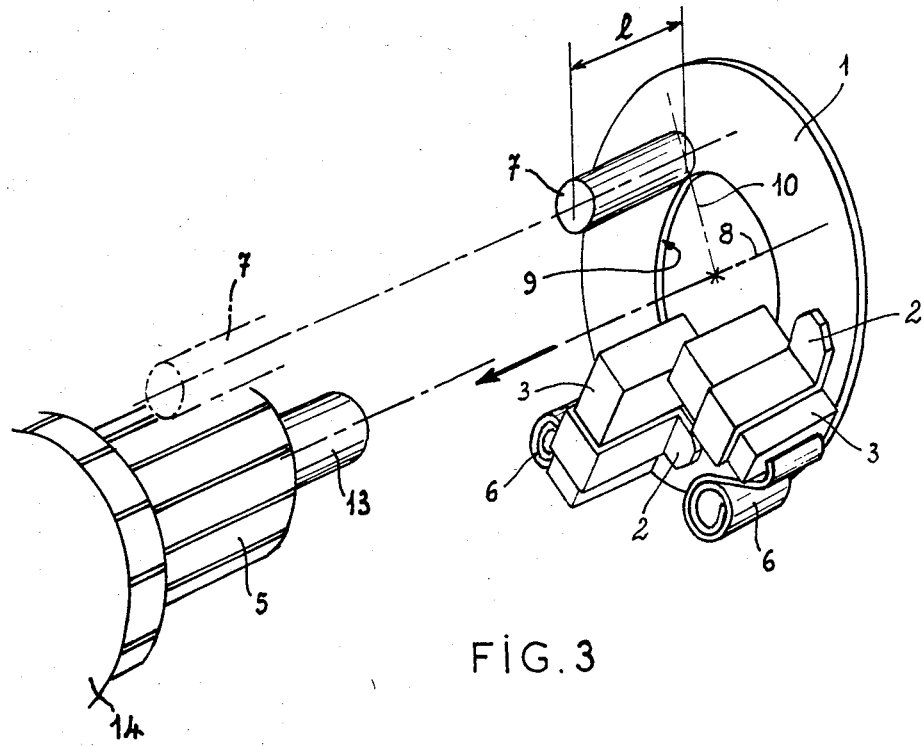
FIG.3

DEVICE FOR HOLDING AND CENTERING OF A BRUSH HOLDER WASHER, DURING ASSEMBLY, ON AN ELECTRIC ROTATING COMMUTATOR MACHINE

FIELD OF THE INVENTION

This invention relates to a device for holding and centering of a brush holder washer, during assembly, this device applying generally to electric rotating commutator machines and, more particularly, to direct current commutator motors of the drum type having more than two poles.

BACKGROUND OF THE INVENTION

In electric motors of this type, such as four-pole motors incorporated in starters for motor vehicle combustion engines, an effort is made to assemble only two brushes and two brush holders placed 90° in relation to one another, a solution that is more economical than another known solution which consists of providing four brushes and four brush holders. However, a problem arises during assembly, particularly when two brush holders placed at 90° are mounted on a support piece in the form of a washer independent of the flange constituting the cover and bearing of the electric motor. If this arrangement of the brush holders as an independent part makes it possible to make the electric connection of the brushes under good accessibility conditions, on the other hand, these brushes, under the pressure of the springs that act on them, cause the support washer to be thrown off center in relation to the commutator, thus making later mounting of the flange, which forms the motor cover and shaft bearing, more difficult.

In numerous cases, this difficulty of mounting the flange resulting from this off-centering leads to abandoning the solution of the support washer to hold the brush holders when they are two and placed at 90°, and this design solution is therefore often limited to four-brush rotating machines only.

SUMMARY, OBJECTS, AND ADVANTAGES OF THE INVENTION

This invention provides a device that avoids the drawbacks mentioned above by holding the brush holder washer substantially centered in relation to the commutator during assembly.

For this purpose, the device of the invention consists essentially of at least a holding piece or part solid with the brush holder washer and extending approximately in the axial direction of said washer, in a zone diametrically opposite that in which the two brush holders are mounted, and at a distance from the axis of the washer slightly greater than the radius of the commutator, so that the pressure of the brushes exerted on the commutator during mounting makes the piece resting against the commutator to thus hold the axis of the washer close to the axis of the commutator.

According to a particularly simple embodiment of this holding and centering device, the holding piece is a single pin solid with the brush holder washer and located approximately on the bisector of the angle formed by the axes of the two brushes, and in opposition to these brushes.

Thanks to this holding piece or part, during engagement of the brush holder washer around an end of the commutator, this washer is placed directly in a position almost coaxial with the commutator, the holding piece being fixed against a generatrix of the commutator and thus limiting the off-centering of the washer to a very slight value. Mounting of the flange forming the cover and bearing can then be performed without difficulties and, at the end of the mounting, the assembly screws of the brush holder washer make possible exact centering of this washer in relation to the flange, therefore in relation to the commutator which puts the holding piece at a distance from the commutator approximately equal to that given to the brush holders.

Preferably the holding piece or part is located on the same face of the brush holder washer as the brushes and extends in the axial direction over a length approximately equal to the size of the brushes in the axial direction, which prevents any swinging of the brush holder washer when it is put in place arond an end of the commutator.

In any case, the invention will be better understood with the help of the following description, with reference to the accompanying diagrammatic drawing showing, by way of nonlimiting example, an embodiment of this device for holding and centering of a brush holder washer, during assembly;

BRIEF DESCRIPTION OF THE DRAWING

FIG. 1 is a diagrammatic showing of an assembly operation illustrating the problem solved by the present invention;

FIG. 2 is a front view, similar to FIG. 1, showing a brush holder washer provided with the device according to the invention in the form of a simple pin, in its temporary assembly position;

FIG. 3 is an exploded perspective view showing the brush holder washer of FIG. 2 illustrating the engagement of its pin on the commutator of an electric motor.

DETAILED SPECIFICATION

Figure 4:
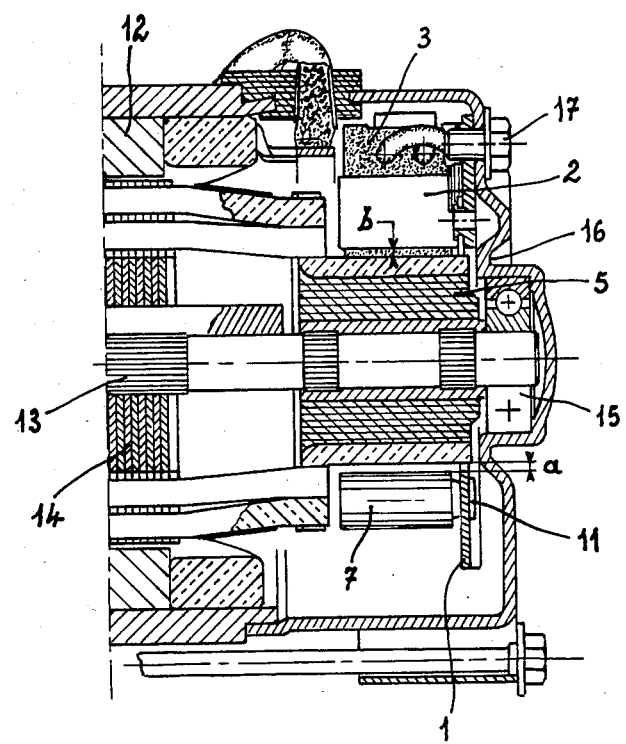
FIG. 4 is a partial view, in longitudinal section, of the electric motor with the brush holder washer mounted in its final position.

The problems in the prior art solved by the present invention are clearly shown in the FIG. 1 diagrammatic representation showing a support washer 1 on which are mounted two brush holders 2 guiding the respective brushes 3 whose axes 4 form a 90° angle. The pressure of the two brushes 3 on one side of commutator 5, under the action of the brush springs 6 is the cause of considerable off-centering, indicated at "e" in FIG. 1.

FIGS. 2 and 3 again show support washer 1 on which are mounted, in a known way, two brush holders 2 guiding the respective brushes 3 whose axes 4 form a 90° angle. According to the invention, this washer 1 carries, on the same face as that supporting the brush holder 2, a cylindrical holding and centering pin 7 extending parallel to the axis 8 of the washer 1. Pin 7 is fastened near the edge of circular opening 9 of the washer, and on bisector line 10 of the angle formed by the axes 4 of the two brushes 3, in the zone diametrically opposite the brushes 2. Pin 7 is, for example, a solid, cylindrically shaped piece, fastened on washer 1 by riveting 11—see FIG. 4—but, of course, also able to be fastened by screwing, welding or any other suitable means. Length (l) of this pin 7 is almost equal to the size of the brushes 3 measured parallel to the direction of axis 8 of washer 1.

When support washer 1 is engaged around an end of commutator 5, it is held at three points constituted by the two brushes 3, subjected to the pressure of springs 6, and by pin 7 which is applied along a generatrix of commutator 5. Considering the position of pin 7 whose radial distance (d) in relation to axis 8 of washer 1 is slightly greater than the radius or commutator 5, there is then obtained for washer 1 a nearly centered temporary assembly position, as shown in FIG. 2.

FIG. 4 shows the electric motor with its stator 12 and its shaft 13 carrying rotor 14 and commutator 5. An end of shaft 13 is mounted to rotate in a bearing 15 carried by a flange 16 also constituting the cover of the motor. Assembly screws 17, which fasten washer 1 inside flange 16, finally make it possible to center this washer 1 exactly in relation to shaft 13, and therefore also in relation to commutator 5, which separates pin 7 from commutator 5. This pin 7 finally is at a distance (a) from commutator 5 approximately equal to distance (d) which separates each brush holder 2 from commutator 5.

Due to the nearly centered temporary position of support washer 1, mounting of flange 16 is thus greatly facilitated.

It goes without saying that the invention is not limited to the single embodiment of this device for holding and centering of a brush holder washer which was described above, by way of example; on the contrary, it encompasses all variants of the embodiment and application thereof. Thus, it is within the scope of the invention to use, instead of the solid cylindrical pin 7, any holding piece, of metal or other material, able to be a cropped piece, a stamped bushing, a bent piece of sheet metal, etc., fastened to the washer by riveting, screwing, welding or other means. Instead of using a special attached piece, it is also possible to provide a part of the washer itself bent to extend in a direction perpendicular to the plane of the washer, to perform the same holding and centering function. This function of holding and centering can be achieved not only by a pointed means but also by an element in the shape of a sector able to be applied on a portion of the commutator during assembly of the brush holder washer, or else by two distinct elements located in a zone diametrically opposite that of the brushes, the holding element or each such element always being solid with the brush holder washer.

Finally, the invention can be applied not only in the case of electric rotating machines with brushes and brush holders placed 90° in relation to one another but also, more generally, to all electric rotating machines comprising brushes and brush holders placed along axes forming an angle different from 180°, therefore entailing a risk of off-centering during assembly of the brush holder washer; for example, the invention applies to a washer with brushes and brush holders forming an angle of 60°, in the case of a six-pole machine.

While the invention has been described in detail above, it is to be understood that this detailed description is by way of example only, and the protection granted is to be limited only within the spirit of the invention and the scope of the following claims.

What is claimed is:

1. A device for holding and centering a brush holder washer during assembly of an electric rotating commutator machine of the type including a casing housing a rotor and a stator both extending axially of the casing, a flange at one end of the casing supporting a bearing for the rotor, the washer supporting two brushes, each mounted in a holder, disposed adjacent one another along axes forming an angle different from 180°, the device comprising:

at least one holding piece, integral with the brush holder washer, extending approximately axially of the casing, the at least one holding piece being located on said washer in a zone diametrically opposite the zone in which the two brush holders are mounted and being located at a distance from the axis of the washer slightly greater than the radius of the commutator so that the pressure of the brushes exerted during mounting on the commutator causes said at least one holding piece to rest against said commutator whereby the axis of the washer is held substantially coincident to the axis of the commutator.

2. Device according to claim 1, wherein said at least one holding piece and said brushes are located on the same face of said brush holder washer, said at least one holding piece extending in the axial direction over a length (1) approximately equal to the length of the brushes in the axial direction.

3. Device according to claim 1, wherein the at least one holding piece is a single pin formed integrally with said brush holder washer and located approximately on the bisector of the angle formed by the axes of the two brushes, the pin being disposed in opposition to said brushes.

4. Device according to claim 3, wherein the pin is a separately formed solid cylindrical shaped piece fastened to said brush holder washer by riveting, screwing or welding.

5. Device according to claim 1, wherein the holding piece is a stamped bushing fastened on the brush holder washer.

6. Device according to claim 1, wherein the holding piece is a bent piece of sheet metal fastened to said brush holder washer.

7. Device according to claim 1, wherein the holding and centering function is assured by a part of said brush holder washer itself, bent to extend in a direction perpendicular to the plane of said washer.

8. Device according to claim 1, wherein the holding and centering function is assured by a sector shaped element, integral with said brush holder washer and able to be applied to a portion of the commutator during mounting of said washer.

9. Device according to claim 1, wherein the holding and centering function is assured by two distinct elements integral with said brush holder washer and located in a zone diametrically opposite that of said brushes.

10. Device according to claim 2 wherein the holding piece is a single pin formed integrally with said brush holder washer and located approximately on the bisector of the angle formed by the axes of the two brushes, the pin being disposed in opposition to said brushes.

* * * * *